(12) United States Patent
Schulte et al.

(10) Patent No.: US 7,081,154 B2
(45) Date of Patent: Jul. 25, 2006

(54) DEVICE AND METHOD FOR DETERMINING A MALFUNCTION IN A FILTER

(75) Inventors: Thomas Schulte, Stuttgart (DE); Bernd Schumann, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 217 days.

(21) Appl. No.: 10/480,512

(22) PCT Filed: Jan. 30, 2003

(86) PCT No.: PCT/DE03/00246

§ 371 (c)(1),
(2), (4) Date: Dec. 11, 2003

(87) PCT Pub. No.: WO03/091553

PCT Pub. Date: Nov. 6, 2003

(65) Prior Publication Data

US 2004/0216614 A1   Nov. 4, 2004

(30) Foreign Application Priority Data

Apr. 24, 2002   (DE) ................................ 102 18 218

(51) Int. Cl.
*B01D 46/00* (2006.01)
(52) U.S. Cl. .................. 95/273; 95/278; 95/8; 96/417; 55/282.2; 55/282.3; 55/385.3; 55/482; 55/523; 55/DIG. 10; 55/DIG. 30; 60/274; 60/311
(58) Field of Classification Search ............... 55/282.2, 55/282.3, 385.3, 482, 523, DIG. 10, DIG. 30; 96/417, 420; 95/8, 18, 273, 278; 60/274, 60/311; 73/28.02, 28.04, 863.22, 863.23, 73/863.24
See application file for complete search history.

(56) References Cited

U.S. PATENT DOCUMENTS

| 4,151,060 | A | * | 4/1979 | Isenberg ....................... 55/523 |
| 4,607,228 | A | * | 8/1986 | Reif ........................... 73/28.02 |
| 5,524,433 | A | * | 6/1996 | Adamczyk et al. ........... 60/311 |
| 5,852,398 | A | * | 12/1998 | Helman ....................... 340/438 |
| 6,162,281 | A | * | 12/2000 | Ammann et al. ................ 95/8 |
| 6,432,168 | B1 | * | 8/2002 | Schonauer ................. 55/282.3 |
| 6,722,120 | B1 | * | 4/2004 | Plote ........................... 60/311 |
| 2001/0013220 | A1 | | 8/2001 | Ulrich |
| 2001/0049999 | A1 | * | 12/2001 | Vanderveen et al. .......... 96/417 |

FOREIGN PATENT DOCUMENTS

DE   41 39 325 C1 *   1/1993

(Continued)

OTHER PUBLICATIONS

Patent Abstracts of Japan, vol. 2000, No. 08, Aug. 5, 2002.

*Primary Examiner*—Jason M. Greene
(74) *Attorney, Agent, or Firm*—Kenyon & Kenyon LLP

(57) ABSTRACT

A device for detecting a failure of a filter used to clean a gas stream, in particular an exhaust gas stream, of soot particulates, including a chamber which is insertable into the gas stream to be cleaned in addition to the filter and which is at least partially closed by a filter body and has at least one opening through which gas entering the chamber through the filter body can exit the chamber, at least one gas sensor for determining the concentration of at least one component of the gas to be cleaned being arranged in the chamber, and at least one second gas sensor for determining the concentration of the at least one component of the gas to be cleaned being arranged outside the chamber.

8 Claims, 2 Drawing Sheets

FOREIGN PATENT DOCUMENTS

| | | | |
|---|---|---|---|
| DE | 198 53 841 | | 6/1999 |
| DE | 198 53 841 A1 | * | 6/1999 |
| EP | 41 39 325 | | 1/1993 |
| FR | 2 802 241 | * | 6/2001 |
| JP | 2002 115 526 | | 4/2002 |
| JP | 2002-115526 | * | 4/2002 |

* cited by examiner

DEVICE AND METHOD FOR DETERMINING A MALFUNCTION IN A FILTER

FIELD OF THE INVENTION

The present invention relates to a device and a method for detecting a failure of a filter.

BACKGROUND INFORMATION

In particular in the case of Diesel combustion engines, it is of importance that the level of soot particulates emitted into the environment be kept as low as possible. To this end, it is useful to monitor the soot particulate emission while the combustion engine is in operation using a sensor mounted in the exhaust branch. In this context, the sensor can be placed downstream or upstream of a soot filter mounted in the exhaust branch. If the sensor is placed in the exhaust branch downstream of the soot filter, the sensor can also be used for monitoring the performance of the soot filter.

Moreover, the concentration of soot particulates in an exhaust gas of a combustion engine may be measured continuously, that is during the normal operation of the engine, to allow direct detection of changes in the engine behavior, for example, because of a failure.

A sensor of the type mentioned at the outset is referred to in German Patent Application DE 198 53 841 A1. This sensor is used in particular to detect soot particulates in an exhaust branch of a motor vehicle having a Diesel combustion engine and includes a first electrode or center electrode, which is connected to a high voltage source, as well as a second electrode or ground electrode, which is at the same potential as the exhaust branch made from metal. The measure used for the concentration of soot particulates in the exhaust gas is either the minimum voltage level at which sparking occurs between the two electrodes, or else, if the electric voltage is kept constant, the magnitude of the ionization current flowing between the two electrodes.

In the case of filters used in conjunction with Diesel engines or in other methods for particulate retention, loading or clogging of the filter can occur and be detected by differential pressure measurement, the differential pressure being measured upstream and downstream of the filter. Until now, no methods, in particular, no methods suitable for mass application in automotive applications are known to allow measurement of leaks or cracks in such a soot filter during operation. However, such leaks or cracks impair the quality of a differential pressure measurement by pressure equalization and considerably increase the emission of particulates.

SUMMARY OF THE INVENTION

An object of an exemplary embodiment and/or exemplary method of the present invention is to provide a way to continuously monitor a retention rate of a filter without depending on differential pressure measurement, which is prone to failure due to leaks. In particular, the aim is to reliably detect even small leaks.

The exemplary embodiment and/or exemplary method of the present invention provides (which may be with little effort) for detecting failures of a filter, in particular, of a soot filter downstream of a Diesel engine. By correlating the concentration fluctuations of a gas component in the gas stream to be cleaned outside the chamber that is inserted into the gas stream according to an exemplary embodiment of the present invention with the corresponding fluctuations inside the chamber, filter clogging can be detected reliably. Failure detection includes in particular also the detection of small leaks or cracks in the filter.

It turns out to be convenient to insert the chamber into the gas stream to be cleaned downstream of the filter to be monitored. When comparing the concentration fluctuations of a gas component, for example within the framework of a Fourier analysis, it is found that the resulting frequency spectrum in the chamber corresponds to the frequency spectrum of a low-pass filter. In this context, the cutoff frequency of the low-pass filter depends on the degree to which the filter to be monitored is loaded with soot.

In particular for the detection of a failure of a soot particle filter downstream of a Diesel engine, it turns out to be convenient to measure the oxygen concentration in the exhaust gas using the two gas sensors. Oxygen sensors are inexpensive to obtain. It turns out that the measurement of oxygen concentration fluctuations leads to a particularly reliable detection of a filter failure.

Advantageously, the flow against the filter body closing the chamber is from the front.

According to a further exemplary embodiment of the device according to the present invention, this device has a heating device acting upon the filter body. Using such a heating device, for example, allows for the burning off of the soot clogging the filter body of the chamber, which allows for the restoring of the original condition of the filter and the associated original frequency response. Using this measure, it may be established whether the clogging of the filter body of the chamber occurred because of a single event, or whether the filter to be monitored is permanently damaged.

According to the exemplary method according to the present invention, the frequency response characteristic and the frequency distribution of the signals of the two gas sensors are recorded over a period of time and related to each other. In this manner, the occurrence of failures of the filter to be monitored can be detected in an easy and prompt manner.

A failure of the filter to be monitored may be detected by determining the limit frequency of the sensor provided in the chamber. In this connection, one takes advantage of the fact that the frequency spectrum of the sensor inserted in the chamber corresponds to the spectrum of a low-pass filter. It is found that the cutoff frequency of this low-pass filter decreases with increasing clogging of the filter body or filter to be monitored.

DETAILED DESCRIPTION

Figure 1:
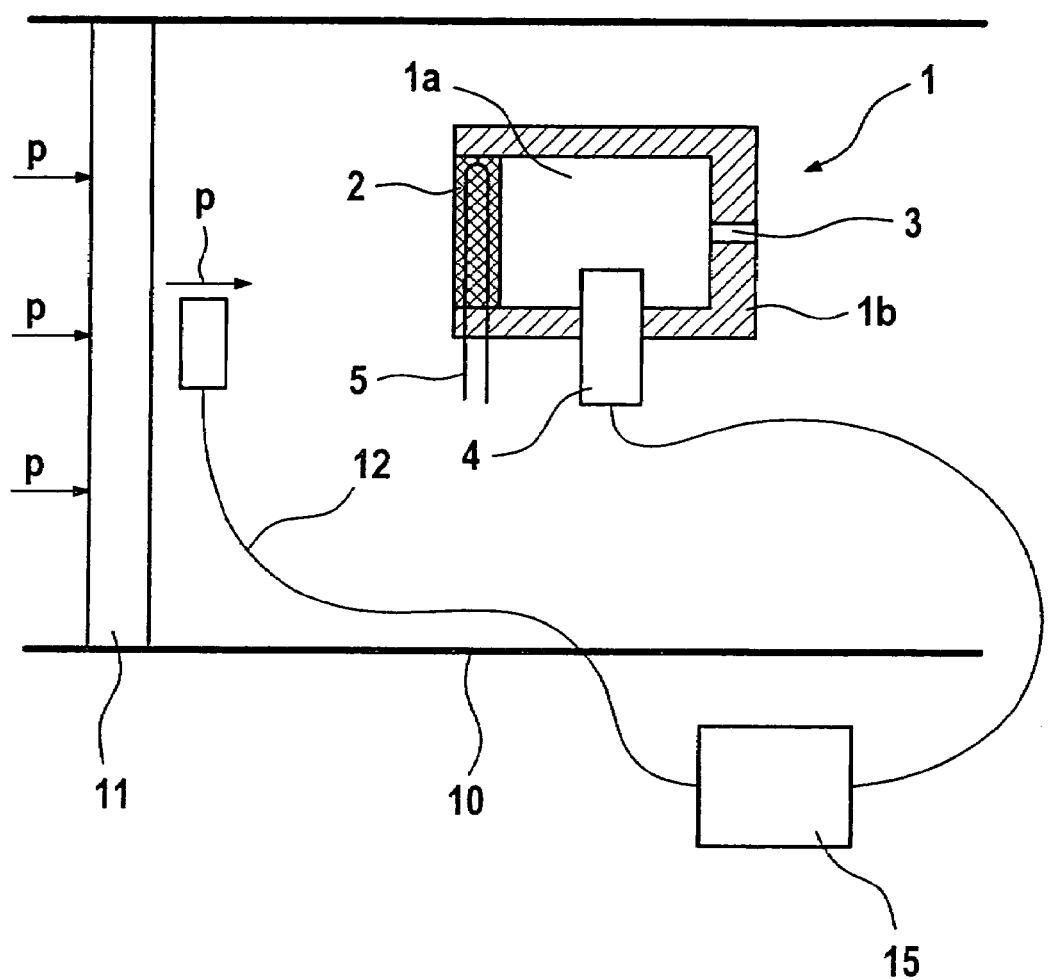
FIG. 1 shows a schematic representation of an exhaust branch including an exemplary embodiment of the device according to the present invention.

In FIG. 1, a chamber provided within the scope of the device according to an exemplary embodiment of the present invention is denoted by 1 in its entirety. Chamber 1 is bounded on one side by a filter body 2 and for the rest by a wall 1*b*. The interior space (dead volume) of the chamber defined in this manner is denoted by 1*a*. The chamber configured in this manner is mounted in an exhaust branch 10 of a Diesel engine downstream of a soot filter 11 to be monitored. It should be emphasized at this point that all components shown are represented in a purely schematic way. The flow direction of the exhaust gas in the exhaust branch is illustrated by arrows P.

It can be seen that the flow of exhaust gas approaches filter body 2 from the front. On its rear side, chamber 1 has an outflow opening 3 through which exhaust gas or gas that has entered space 1a through filter body 2 can exit this space.

Moreover, chamber 1 shown is designed to include an exhaust gas sensor 4, which is able to measure, for example, the oxygen concentration in the exhaust gas.

In filter body 2, there is formed a heating device 5 which allows for the burn off of soot that has accumulated in filter body 2.

Arranged between soot filter 11 to be monitored and chamber 1 is a further gas sensor 12. The measuring results of sensors 4 and 12 can be transferred to a computer and evaluation unit 15 located outside or inside the exhaust branch.

In the ideal case, the exhaust gas stream that has passed through soot filter 11 is free of particulates. Subsequently, this particulate-free exhaust gas stream enters chamber 1 through filter body 2 and then exits the chamber through outlet 3 at the rear.

Gas sensors 4 and 12 detect the concentration fluctuations of an exhaust gas component, preferably of the oxygen, in the chamber and, respectively, between soot filter 11 and chamber 1 in exhaust branch 10.

Filter body 2 is preferably essentially identical in design to soot filter 11.

Computer and evaluation unit 15 records the signals of gas sensors 4 and 12 in their frequency response characteristic and frequency distribution (frequency spectrum) over a certain period of time, for example, over a period of 1 to 10 minutes. When correlating the frequency distributions of the respective sensor signals in a suitable manner, it is found that chamber 1 acts as a low-pass filter; that is, above a certain limit frequency, the frequency spectrum of gas sensor 4 shows a sharp drop compared to the frequency spectrum recorded by gas sensor 12.

Figure 2:
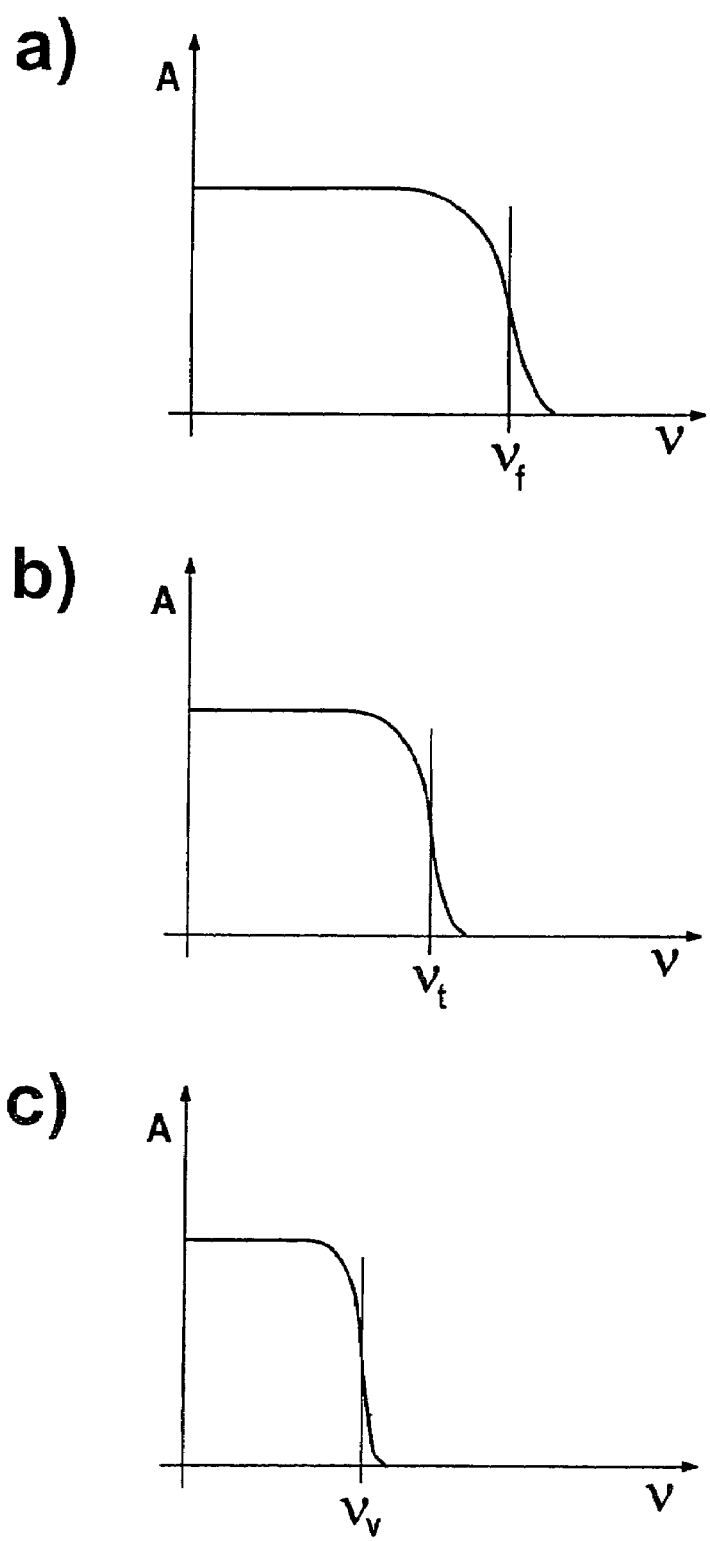
FIG. 2 shows the frequency responses of an oxygen concentration, which is determined by a sensor arranged in the chamber depicted in FIG. 1, as a function of a clogging condition of a filter to be monitored.

This phenomenon is shown in FIG. 2. FIGS. 2a through 2c each show frequency responses, i.e., amplitude A plotted against frequency v, of the oxygen concentration in chamber 1 for different loading conditions. A limit frequency $v_f$ or $v_t$ or $v_v$ characterizing the low-pass effect of the chamber is drawn explicitly for each loading condition shown.

In this context, FIG. 2a shows, by way of example, the frequency response of the oxygen concentration in the chamber for a filter body 2 that is clear, i.e., not clogged.

When comparing this frequency response to the frequency response of the oxygen concentration of the chamber in the case of a partially loaded filter body, it is found that limit frequency $v_f$ (see FIG. 2a) is greater than the limit frequency $v_t$ for a partially loaded filter body (see FIG. 2b). This effect occurs more strongly when the filter body is completely clogged, as can be seen from limit frequency $v_v$ in FIG. 2c, which shows the frequency response of the oxygen concentration in the chamber for a completely clogged filter body.

Altogether therefore it is found that when filter body 2 of chamber 1 is clogged with particulates, the low-pass properties of this chamber with respect to the gas concentration fluctuations change very rapidly in such a way that the upper limit frequency decreases. As explained, this is advantageously observed by evaluating the spectrum of the gas concentration fluctuations. If now the filter is determined to be partially loaded or clogged using the described method, the soot accumulated in filter body 2 can be burned off by heating device 5, allowing the original frequency response (limit frequency $v_{clear}$ to be restored. If it is subsequently found that the limit frequency begins to decrease again after only a short time, a defect or failure of soot filter 11 may be inferred. However, if the limit frequency does not decrease again, it can be assumed that the clogging of filter body 2 was due to a one-time effect such as a fuel contamination.

Chamber 1 is preferably cylindrical and mounted over gas sensor 4. In this context, as mentioned, filter body 2 conveniently faces the exhaust gas stream. Space 1a (dead volume) and outflow opening 3 can be sized in such a manner that time constants of 5 to 200 seconds will result in the case of a clogged filter. A chamber with a clear filter body should conveniently have time constants below 10 seconds so that the time periods for recording spectra of the concentration fluctuations will not require excessive amounts of recording time.

It should be noted that the detection, according to an exemplary embodiment of the present invention, of failures of soot filter 11 can also be accomplished using different correlation methods (not specifically shown here) for the signals of gas sensors 4 and 12.

The invention claimed is:

1. A device for detecting a failure of a filter used to clean an exhaust gas stream of soot particulates, comprising:
   a chamber which is insertable, in addition to the filter, into the gas stream to be cleaned and which is at least partially closed by a filter body and has at least one opening through which gas entering the chamber through the filter body can exit the chamber again;
   at least one gas sensor for determining a concentration of at least one gaseous component of the gas to be cleaned being arranged in the chamber; and
   at least one second gas sensor for determining the concentration of the at least one gaseous component of the gas to be cleaned being arranged outside the chamber.

2. The device of claim 1, wherein the chamber is inserted into the gas stream to be cleaned in an exhaust branch downstream of the filter used to clean the exhaust gas stream of the soot particulates.

3. The device of claim 1, wherein the gas sensors are used to determine a concentration of oxygen contained in the gas to be cleaned.

4. The device of claim 1, wherein the chamber is arranged in the gas stream so that the flow approaches the filter body from the front.

5. The device of claim 1, wherein a heating device acts upon the filter body.

6. The device of claim 1, wherein a computer and evaluation unit are operatively connected to the gas sensors.

7. A method for detecting a failure of a filter used to clean a gas stream, the method comprising:
   making a correlation between measurement values recorded by at least one gas sensor for determining a concentration of at least one gaseous component of the gas to be cleaned and at least one second gas sensor for determining the concentration of the at least one gaseous component of the gas to be cleaned; and
   detecting a failure of the filter based on the correlation;
   wherein the method is performed using a device for detecting the failure of a filter used to clean an exhaust gas stream of soot particulates, the device including:
   a chamber which is insertable, in addition to the filter, into the gas stream to be cleaned and which is at least partially closed by a filter body and has at least one opening through which gas entering the chamber through the filter body can exit the chamber again;

the at least one gas sensor for determining a concentration of at least one gaseous component of the gas to be cleaned being arranged in the chamber; and the at least one second gas sensor for determining the concentration of the at least one gaseous component of the gas to be cleaned being arranged outside the chamber.

8. The method of claim 7, wherein a frequency response characteristic and a frequency distribution of the measurement values the at least one gas sensor and the at least one second gas sensor are recorded over a period of time and related to each other.

* * * * *